United States Patent [19]
Yoshida

[11] Patent Number: 5,949,552
[45] Date of Patent: Sep. 7, 1999

[54] IMAGE TRANSMISSION USING ERROR RETRANSMISSION

[75] Inventor: Takehiro Yoshida, Tokyo, Japan

[73] Assignee: Canon Kabushiki Kaisha, Tokyo, Japan

[21] Appl. No.: 08/854,774

[22] Filed: May 12, 1997

Related U.S. Application Data

[63] Continuation of application No. 08/389,685, Feb. 16, 1995, abandoned.

[30] Foreign Application Priority Data

Feb. 17, 1994 [JP] Japan ................................. 6-043033

[51] Int. Cl.$^6$ .................................................. H04N 1/333
[52] U.S. Cl. ......................... 358/435; 358/436; 358/403; 358/404
[58] Field of Search ................................... 358/434–444, 358/404, 468, 405, 406, 403; 371/3, 32, 37.1; 714/748–752, 821; H04N 1/333

[56] References Cited

U.S. PATENT DOCUMENTS

| | | |
|---|---|---|
| 4,829,524 | 5/1989 | Yoshida . |
| 4,885,755 | 12/1989 | Yoshida . |
| 5,031,179 | 7/1991 | Yoshida . |
| 5,075,783 | 12/1991 | Yoshida et al. ......................... 358/434 |
| 5,172,246 | 12/1992 | Yoshida . |
| 5,208,681 | 5/1993 | Yoshida ................................. 358/434 |
| 5,220,439 | 6/1993 | Yoshida . |
| 5,251,043 | 10/1993 | Hamano et al. ....................... 358/444 |
| 5,438,427 | 8/1995 | Yoshida ................................. 358/405 |
| 5,535,015 | 7/1996 | Yoshida ................................. 358/434 |
| 5,668,641 | 9/1997 | Tsukamoto et al. ................... 358/436 |
| 5,673,033 | 9/1997 | Yoshino ................................. 358/437 |

Primary Examiner—Kim Yen Vu
Attorney, Agent, or Firm—Fitzpatrick, Cella, Harper & Scinto

[57] ABSTRACT

Multiple page image information is communicated efficiently in such a manner that a receiver informs to a transmitter an amount of data receivable one time, the transmitter transmits one time up to the designated data amount (which may be multiple page information), the receiver informs the amount of data next receivable and indicates an error frame received in the previous transmission, and the transmitter transmits the image information of the designated error frame followed by the transmission one time of the succeeding image information up to the designated data amount.

15 Claims, 7 Drawing Sheets

FIG. 6

IMAGE TRANSMISSION USING ERROR RETRANSMISSION

This application is a continuation of application Ser. No. 08/389,685 filed Feb. 16, 1995, now abandoned.

BACKGROUND OF THE INVENTION

1. Field of the Invention

The present invention relates to an image transmission method by an error retransmission mode.

2. Related Background Art

In a prior art facsimile apparatus having an ECM function, an image signal is transmitted by a high speed modem such as V.17, V.29 or V.21ter and a protocol signal representing a partial page is transmitted by a low speed modem such as V.21.

For the image signal, a protocol signal is added when a punctuation of a physical page on the transmitting station or one page of information exceeds one block (one block=245 frames, one frame=256 bytes).

However, when it is assumed that ten sheets of information each having 30 frames as one page of physical page information are to be transmitted without error at a transmission rate after the establishment of pre-protocol of 28.8 (kb/s), the time required per page is 30×256÷28800≅0.27 (sec), the time for training is 0.2 sec, for example, and the time for the protocol is approximately 2 sec so that a total time of 2.47 seconds is required. Accordingly, when ten sheets are transmitted, it requires 24.7 seconds. However, the actual transmission time of the image signal is approximately 2.7 seconds for the ten sheets and the time required for the protocol signal is wasted.

SUMMARY OF THE INVENTION

It is an object of the present invention to provide an image communication method and an image communication apparatus which can perform efficient image communication.

It is another object of the present invention to provide an image communication method and an image communication apparatus which efficiently transmit multiple physical page of image information.

In order to achieve the above objects, in accordance with the present invention, a receiver informs to a transmitter an amount of data receivable one time, the transmitter transmits one time up to the designated data amount (which may be multiple page information), the receiver informs the amount of data next receivable and indicates an error frame received in the previous transmission, and the transmitter transmits the image information of the designated error frame followed by the transmission one time of the succeeding image information up to the designated data amount.

In accordance with another aspect of the present invention, if there is an error frame in the image signal received one time by the receiver after the receiver has received a signal representing a punctuation of the transmission of the image signal, the receiver transmits the page number, the block number and the frame number of the error as well as the amount of receivable data one time before a signal representing a punctuation of the transmission of the next image signal, the transmitter sequentially receives the page number, the block number and the frame number of the error designated by the receiver and transmits multiple page image signal one time up to the receivable data amount designated by the receiver.

BRIEF DESCRIPTION OF THE DRAWINGS

FIG. 4 is comprised of FIGS. 4A and 4B show flow charts of an operation of the second embodiment.

DETAILED DESCRIPTION OF THE PREFERRED EMBODIMENTS

An embodiment of the present invention, is now explained in detail with reference to the drawings. In the following embodiment, a facsimile apparatus is described as an image communication apparatus.

Figure 1:
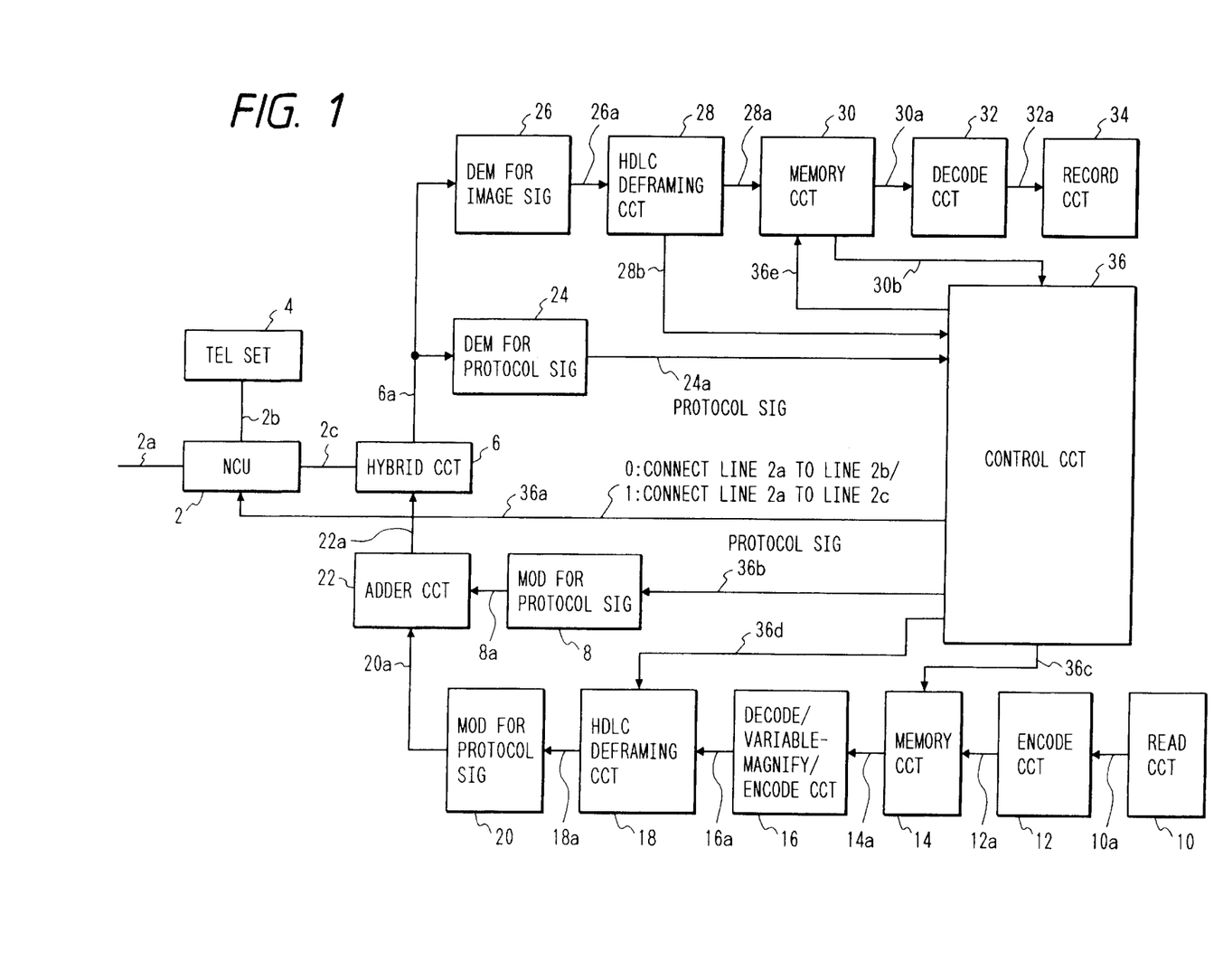
FIG. 1 shows a block diagram of an embodiment of the present invention.

FIG. 1 shows a block diagram of a facsimile apparatus in accordance with the present embodiment of the present invention.

An NCU (network control unit) 2 connects a telephone network to line terminals for use in the data communication to control the connection of the switching network, switch data transmission lines and maintain a loop. When a signal level (signal line 36a) from a control circuit 36 is '0', the NCU 2 connects a telephone line 2a to a telephone set 4, and when the signal level is '1', it connects the telephone line 2a to the facsimile apparatus. In a normal state, the telephone line 2a is connected to the telephone set 4.

A hybrid circuit 6 separates a transmitting signal from a receiving signal, sends a transmission signal from an adder circuit 22 to the telephone line 2a via the NCU 2, receives a signal from a calling station via the NCU 2 and sends it to a demodulator 26 and a demodulator 24 via a signal line 6a.

A protocol signal modulator 8 modulates a protocol signal in accordance with the known CCITT Recommendation V21 or Q.PSK (Quadruple Phase Shift Keying). It modulates a protocol signal (signal line 36b) from the control circuit 36 and sends it to the adder circuit 22 via a signal line 8a.

A read circuit 10 sequentially reads one line of image signal along a main scan direction from a transmitting document sheet, produces a black and white binary signal train, and sends the data to an encoding circuit 12 via a signal line 10a. It comprises an image pickup device such as a CCD (charge coupled device) and an optical system.

The encoding circuit 12 receives read data outputted on the signal line 10a, conducts the encoding (MR encoding with K=8) and outputs it to a signal line 12a.

A memory circuit 14 stores the data encoded with K=8 outputted to the signal line 12a under the control of a signal line 36c and outputs the stored encoded data to a signal line 14a.

A decoding/variable magnification/encoding circuit 16 receives the encoded data outputted to the signal line 14a, decodes it, variable magnifies and encodes it again, and outputs the resulting information to a signal line 16a.

A framing circuit 18 receives the encoded image data outputted to the signal line 16a and receives address data, FCD (Facsimile Coded Data) data, frame number data and RCP (Return to Control for Partial page) data (RCP including information on the page number, the block number and the frame number) and outputs information framed by HDLC (High level Data Link Control procedures) to a signal line 18a.

An image signal modulator 20 receives the encoded data from the signal line 18a and modulates the image signal in accordance with the known CCITT Recommendation V.27ter (differential phase modulation), V.29 (quadrature modulation), V.17 or V.34, and outputs the modulated data to the adder circuit 22 through a signal line 20a.

The adder circuit 22 adds the outputs of the modulators 8 and 20. The output of the adder circuit 22 is sent to the hybrid circuit 6.

A protocol signal demodulator 24 demodulates a protocol signal in accordance with the known CCITT Recommendation V.21 or Q-PSK. The demodulator 24 receives the protocol signal from the hybrid circuit 6 via the signal line 6a, demodulates it and sends the demodulated data to the control circuit 36 through a signal line 24a.

An image signal demodulator 26 demodulates the image signal in accordance with the known CCITT Recommendation V.27ter, V.29, V.17 or V.34. The demodulator 26 receives the modulated image signal from the hybrid circuit 6, demodulates it and sends the demodulated data to a signal line 26a.

A defaming circuit 28 receives the demodulated data outputted to the signal line 26a, deframes it with HDLC and outputs the deframed image data to a signal line 28a, and it also outputs address, FCD data, frame number data, RCP data and frame FCS (Frame Check Sequence) check result to a signal line b.

A memory circuit 30 stores the deframed and demodulated data outputted to the signal line 28a under the control of the control circuit 36 via a signal line 36e and outputs the stored data to a signal line 30a. The memory circuit 30 outputs an available memory capacity to a signal line 30b.

A decoder circuit 32 decodes (MH decoding, MR decoding or MMR decoding) the data from the signal line 30a and outputs the decoded data to a signal line 32a.

A record circuit 34 receives the data outputted to the signal line 32a and sequentially records it one line at a time.

A control circuit 36 controls a series of communication control process in the facsimile apparatus of the present embodiment such that in the transmission of the image signal, when a protocol signal representing a punctuation of the transmission of the image signal is to be communicated, the receiver informs to the transmitter a data amount receivable as the image signal received one time before the protocol signal representing the punctuation of the transmission of the image signal, and the transmitter transmits one time up to the data amount informed by the receiver.

Figure 2:
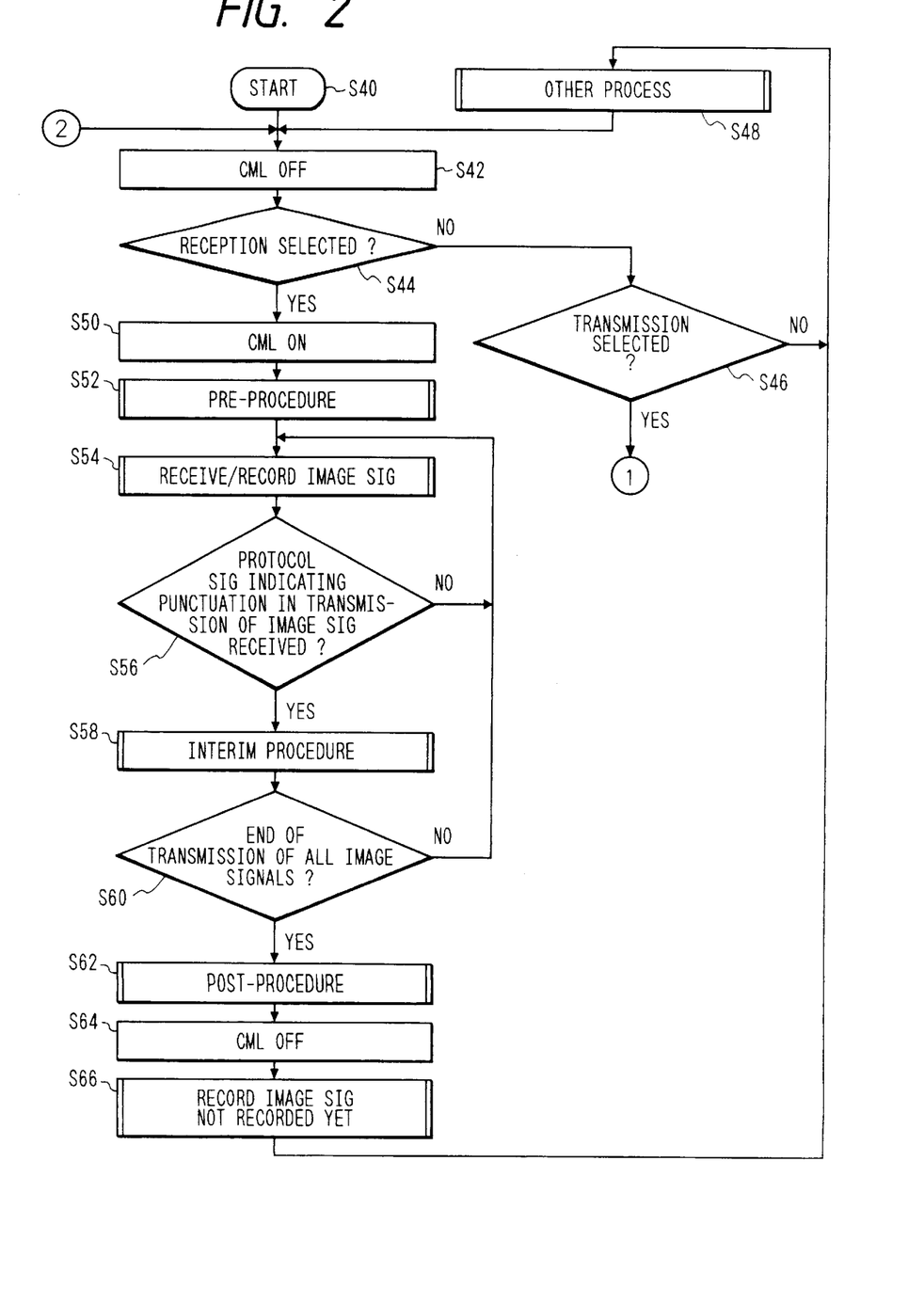
FIG. 2 shows a flow chart of an operation of a first embodiment of the present invention.
Figure 3:
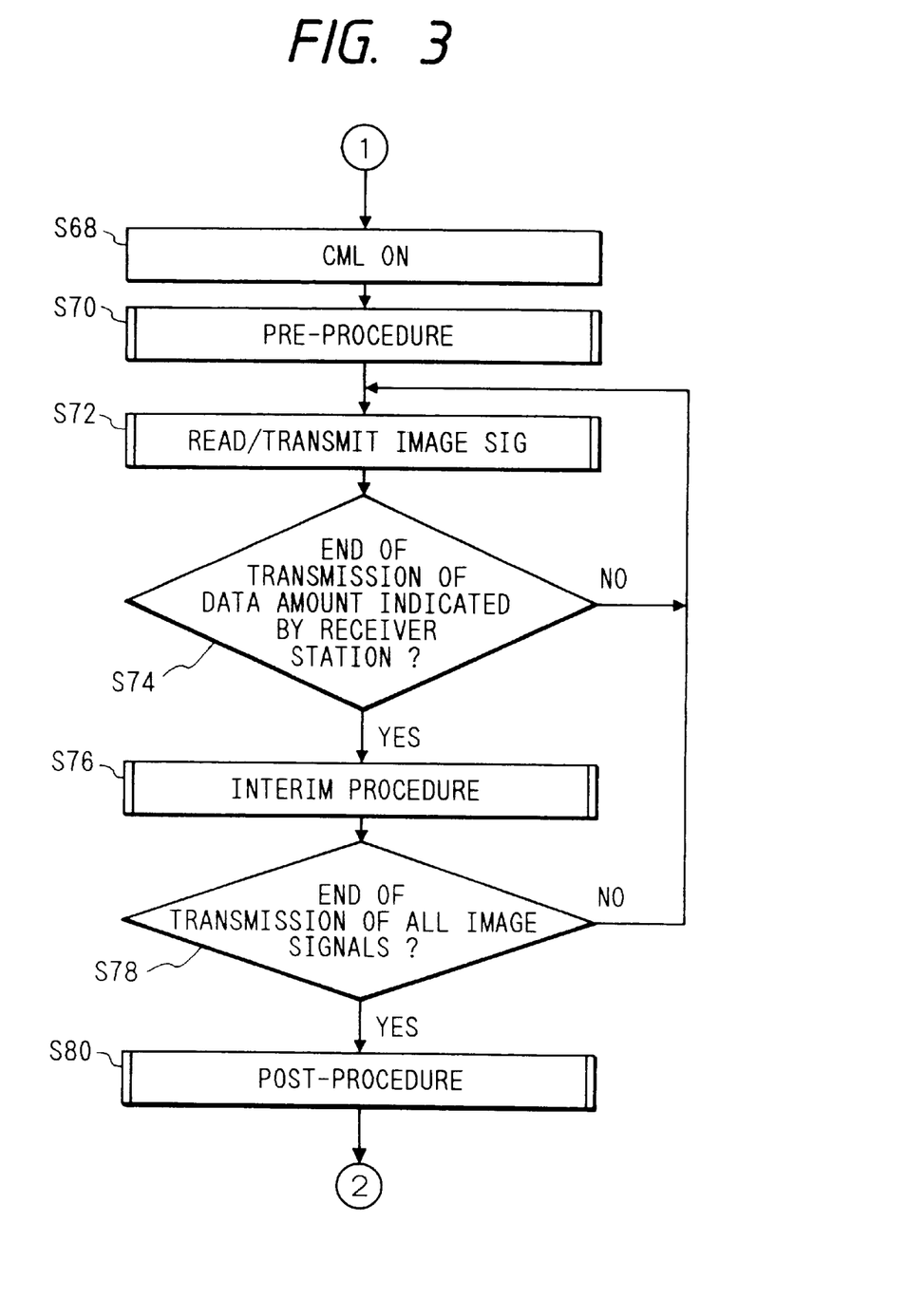
FIG. 3 shows a flow chart of an operation of the first embodiment.

FIGS. 2 and 3 show flow charts of the control of the control circuit 36 in a first embodiment of the present invention.

FIG. 2 primarily shows an operation in the receiver. In S42, a signal level '0' is outputted to the signal line 36a to turn off the CML. In S44 and S46, whether the reception and the transmission have been selected or not are determined, respectively. If the reception is selected, the process proceeds to S50, and if the transmission is selected, the process proceeds to S68. If none is selected, the process proceeds to S48 to conduct other process.

In S50, the signal level '1' is outputted to the signal line 36a to turn on the CML. In S52, a pre-protocol is conducted. The pre-protocol includes a protocol by V.8. The information on the signal line 36b is read and the data amount receivable one time is informed to the transmitter.

Then, in S54, the image signal is received and recorded. It is continuously recorded until an error frame occurs. Multiple page recording is made.

In S56, the information on the signal line 24a is received and whether the protocol signal representing the punctuation of the transmission of the image signal has been received or not is determined. If it is received, the process proceeds to S56, and if it is not received, the process returns to S54 to continue the reception and the recording.

In S58, an intermediate protocol is conducted. The data amount receivable one time is read from the signal line 36h and it is informed to the transmitter.

In S60, whether the transmission of the entire image signal has been completed in the transmitter or not is determined. If it is completed, the process proceeds to S62, and if it is not completed, the process proceeds to S54 to continue the reception and the recording.

In S62, a post protocol is conducted. In S64, the signal level '1' is outputted to the signal line 36a to turn off the CML. In S66, if there is unrecorded received information, it is recorded.

FIG. 3 shows an operation of the transmitter. In S68, the signal level '1' is outputted to the signal line 36a to turn on the CML. In S70, a pre-protocol is conducted. The pre-protocol includes a protocol by V.8. The data of the amount receivable one time informed by the receiver is stored.

In S72, the image signal is read and transmitted. The data of the amount receivable one time is transmitted one time. The multiple page transmission is conducted.

In S74, whether the transmission of the data of the amount designated by the receiver has been completed or not is determined. If it is completed, the process proceeds to S76, and if it is not completed, the process returns to S72 to continue the reading and the transmission of the image data.

In S76, an intermediate protocol is conducted. The data of the amount receivable one time informed from the receiver is stored.

In S78, whether the transmission of the entire image signal has been completed or not is determined, and if it is completed, the process proceeds to S80 to conduct a post protocol. If it is not completed, the process returns to S72 to continue the reading and the recording of the image signal.

In the first embodiment, it is assumed that the information which bears the image signal of multiple pages transmitted one time includes no error. In a second embodiment, the following control is added to cope with the occurrence of an error.

In the second embodiment, if there is an error frame in the image signal received one time after the receiver has received the protocol signal representing the punctuation of the transmission of the image signal, the receiver transmits the page number, the block number and the frame number of the error together with the data amount receivable one time before the protocol signal representing the punctuation of the transmission of the next image signal, and the transmitter sequentially transmits the frames of the error pages, error blocks and error frames designated by the receiver and then transmits the multiple page image signal one time up to the data amount receivable one time informed by the receiver.

FIGS. 4A to 6 show flow charts of portions of the above operation which are different from those of the first embodiment.

Figures 4, 4A:
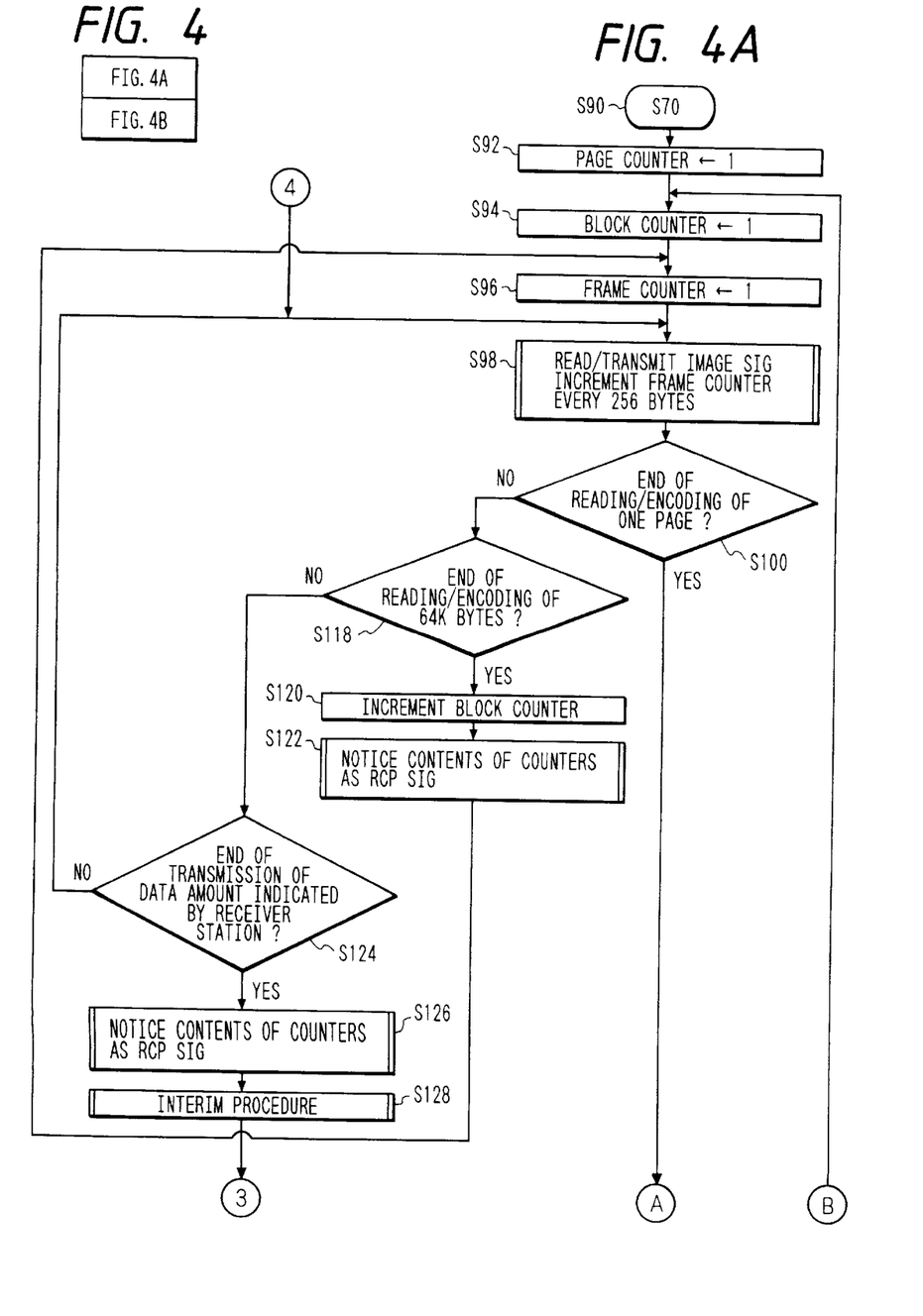
Figure 4B:
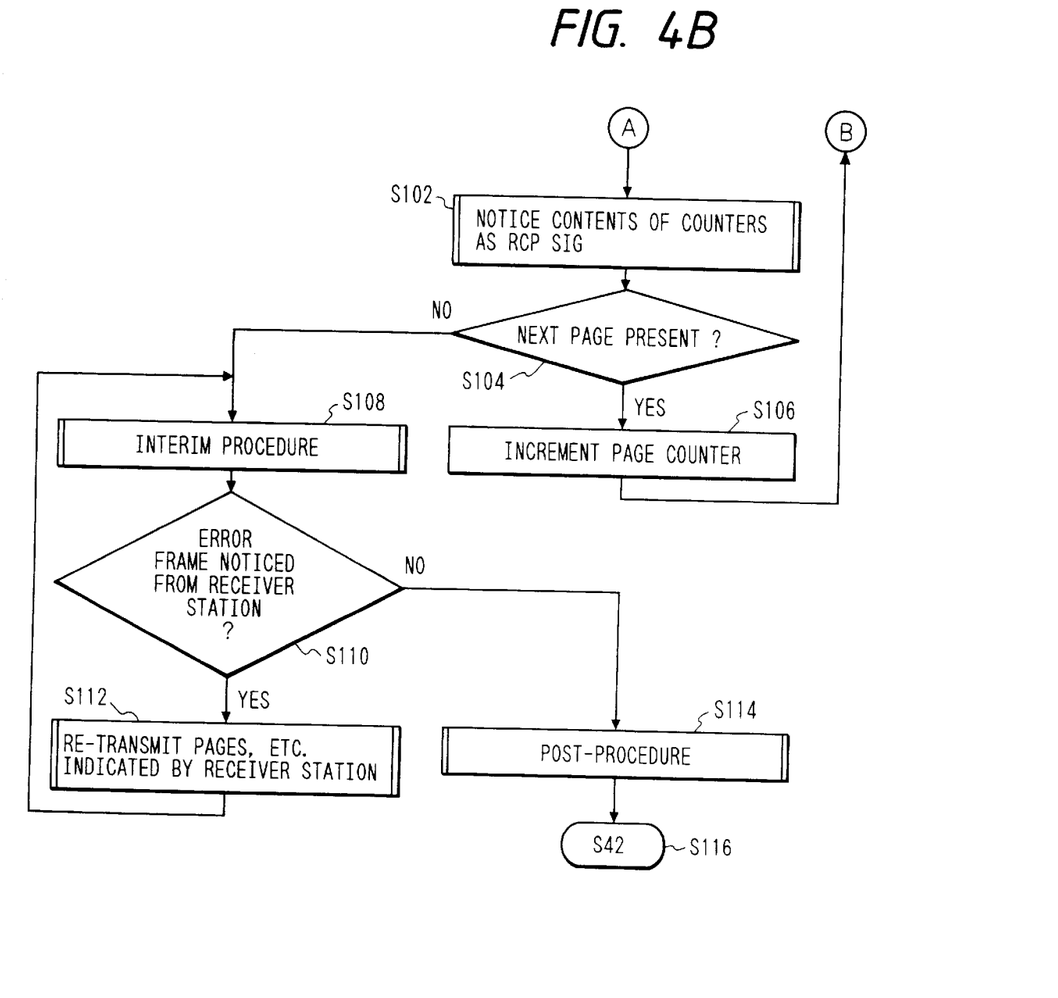

In FIGS. 4A and 4B, S90 corresponds to S70 of FIG. 3. In S92, '1' is set in a page counter, in S94, '1' is set in a block counter, and in S96, '0' is set in a frame counter.

In S98, the image signal is read and recorded. The content of the frame counter is incremented by one for every 256 bytes of data.

In S100, one page is read and whether the encoding has been completed or not is determined. If it is completed, the process proceeds to S102, and if it is not completed, the process proceeds to S118.

In S102, the page counter, the contents of the block counter and the frame counter are informed to the receiver as a RCP signal.

In S104, whether the next page is present or not is determined, and of it is, the process proceeds to S106 to increment the page counter by one, and the process returns to S94.

If the next page is not present, the process proceeds to S108 to conduct an intermediate protocol. In S110, whether the error frame has been informed from the receiver or not is determined, and if it has, the process proceeds to S112 to retransmit the pages, blocks and frames of the numbers designated by the receiver. The FCD data includes the page number and the block number. The process then returns to S108.

In S118, if the error frame is not informed, the process proceeds to S114 to conduct a post protocol. Then, the process returns to S42 of FIG. 2 (S116).

In S118, the 64 K bytes data is read and whether the encoding has been completed or not is determined. If it is completed, the process proceeds to S120, and if it is not completed, the process proceeds to S124.

In S120, the content of the block counter is incremented by one. In S122, the contents of the page counter, the block counter and the frame counter just transmitted are informed to the receiver as the RCP information.

In S124, whether the transmission of the data of the amount receivable one time designated by the receiver has been completed or not is determined, and if it is completed, the process proceeds to S126, and if it is not completed, the process returns to S98 to read and transmit the image signal.

In S126, the contents of the page counter, the block counter and the frame counter just transmitted as the RCP signal are informed to the receiver. In S128, an intermediate protocol is conducted. The data of the amount receivable one time informed by the receiver is stored.

Figure 5:
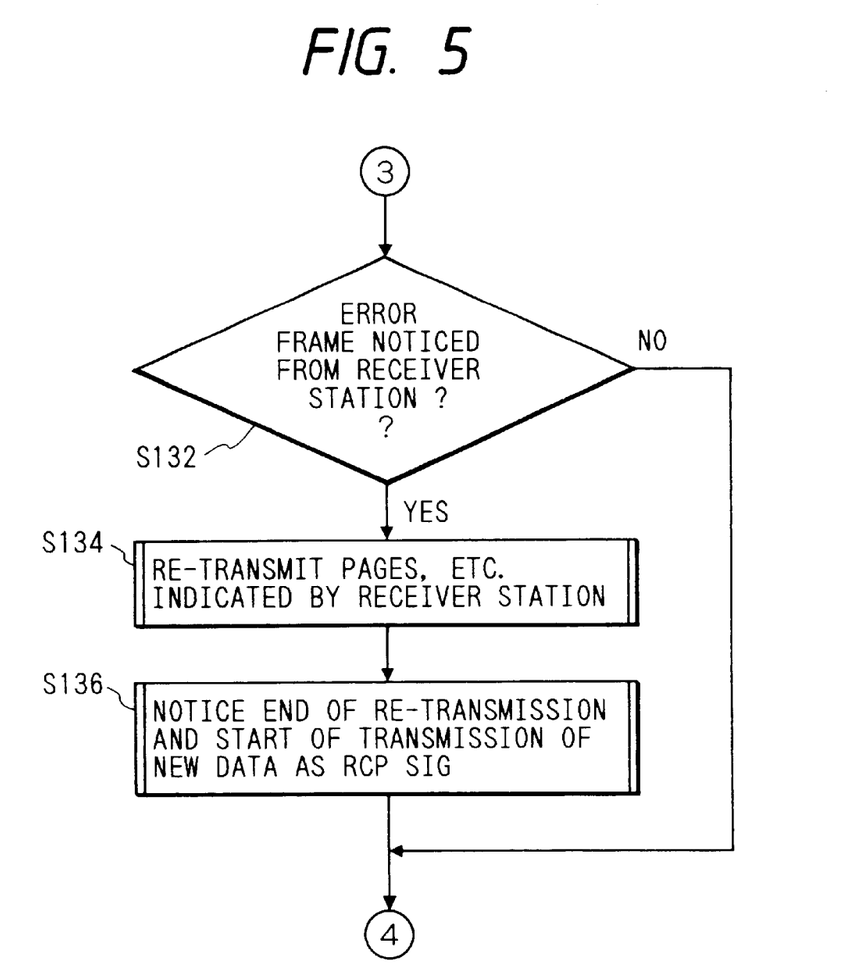
FIG. 5 shows a flow chart of an operation of a second embodiment.

Referring to FIG. 5, in S132, whether the error frame has been informed from the receiver or not is determined. If it has, the process proceeds to S134, and if it has not, the process returns to S98 of FIG. 4A to read and transmits the image signal.

In S134, the pages, blocks and frames of the numbers designated by the receiver are transmitted. The FCD data includes the page number and the block number.

In S136, the completion of the retransmission of the error frame and the transmission of the new data are informed as the RCP signal.

Figure 6:
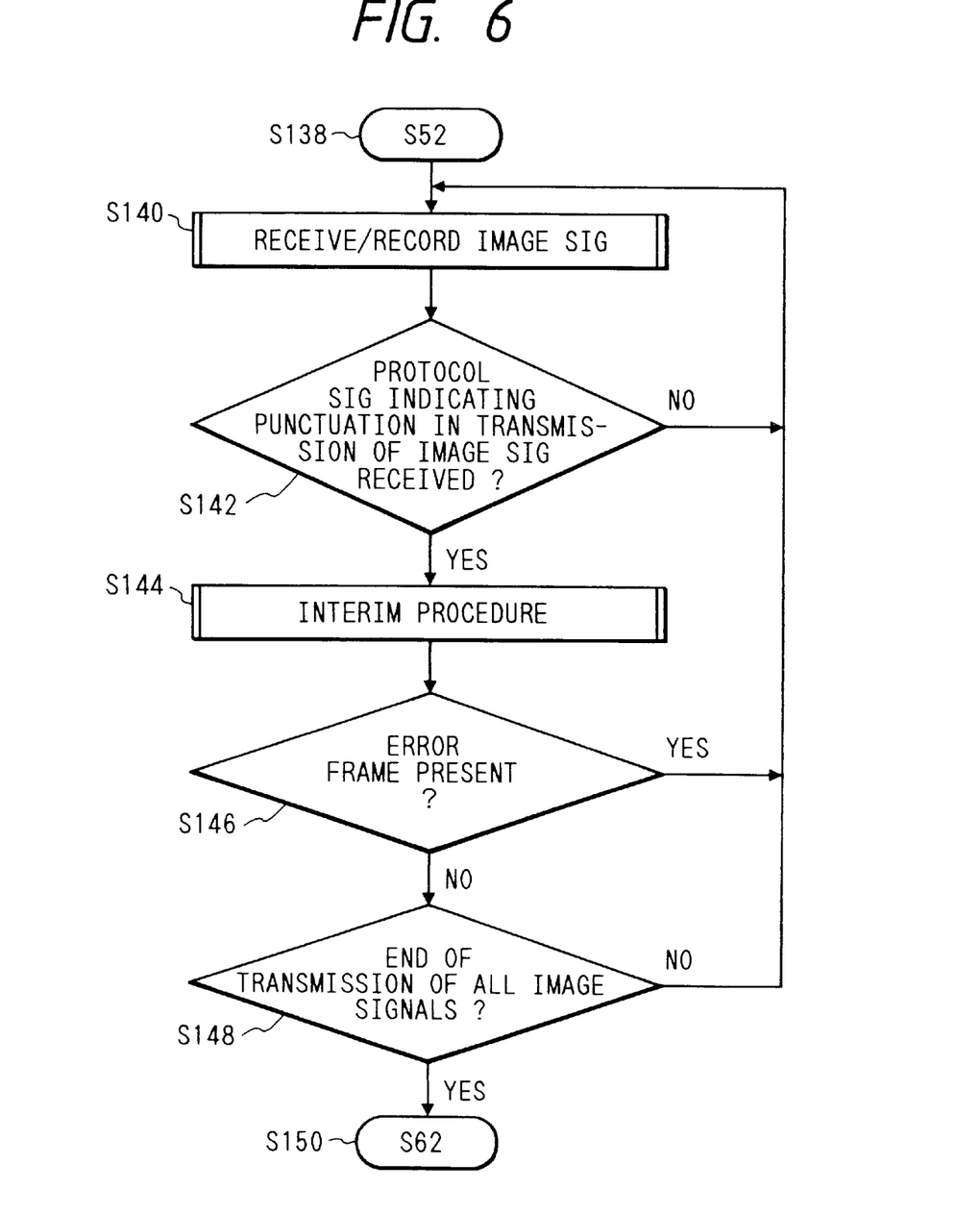
FIG. 6 shows a flow chart of an operation of the second embodiment.

Referring to FIG. 6, S138 corresponds to S52 of FIG. 2. In S140, the image signal is received and recorded. The recording is made until an error frame occurs.

In S142, whether the protocol signal representing the punctuation of the transmission of the image signal has been received or not is determined. When it is received, the process proceeds to S144, and when it is not received, the process returns to S140 to continue the reception and the recording of the image signal.

In S144, an intermediate protocol is conducted. If there is an error frame, the page number, the block number and the frame number thereof are informed. The data of the amount receivable one time is received from the signal line 36b and it is informed to the transmitter.

In S146, whether the error frame is present or not is determined. If it is, the process proceeds to S140 to continue the reception and the recording of the image signal. If the error frame is not present, the process proceeds to S148 to determine whether the transmission of the entire image signal has been completed or not. If it has, the process proceeds to S150 (S62 in FIG. 2), and if it has not, the process returns to S140 to continue the reception and the recording of the image signal.

In accordance with the above process, a transmission time of one communication can be shortened where the transmission time of one page of image signal is shorter than the transmission time of the protocol signal. Also, an error frame can be re-transmitted arcurately.

In the overseas communication, the delay of the transmission line affects in the switching of the transmission and the reception. Thus, the present invention in which the switching of the transmission and the reception is reduced is particularly effective. For example, where ten sheets of 30 frames image information per physical page can be received one time by the receiver without error and the transmission rate after the establishment of the pre-protocol is 28.8 kb/s, the transmission time requires for one page is $30 \times 256 \div 28800 \cong 0.27$ (sec) and it is 2.7 (sec) for ten pages. The training time is only once and it is 0.2 second, for example and a time of two second for the protocol is added thereto so that a total time is 4.9 seconds which is significantly shorter than 24.7 seconds discussed in the prior art.

It should be understood that the present invention is not limited to the above embodiments and various modifications thereof may be made.

What is claimed is:

1. An image communication method for transmitting an image signal block having a predetermined data amount from a transmitter to a receiver by an error retransmission mode and requesting, by the receiver to the transmitter, retransmission of the image signal block when an error is included in the received image signal block, comprising the steps of:

informing, by the receiver to the transmitter, an amount of data receivable at one time; and transmitting, by the transmitter, an image data unit which includes multiple pages and is at least one image signal block, said unit being equal to the receivable data amount informed by the receiver at said informing step, wherein the multiple pages are transmitted without a procedure signal between the pages.

2. An image communication method according to claim 1, further comprising the steps of:

when a frame including an error is included in a received image data unit, transmitting, at one time, by the receiver a page number, a block number and a frame number corresponding to the error together with a new data amount receivable; and sequentially transmitting by the transmitter the page, block and frame numbers transmitted by the receiver at said transmitting step and then transmitting, at one time, the multiple page image signal of the new data amount receivable informed by the receiver.

3. A data communication apparatus for transmitting a data block having a predetermined data amount to a receiver by an error retransmission mode and which enables requesting, by the receiver to said apparatus, retransmission of the data block when an error is included in the data block as received by the receiver, said apparatus comprising:

means for storing data corresponding to a plurality of physical pages;

means for forming a data block including the stored data corresponding to a plural number of the plurality of physical pages; and means for transmitting the data block, wherein said apparatus is operative in either a first mode, wherein a data block to be transmitted includes data corresponding to a plural number of physical pages, or a second mode, wherein a data block to be transmitted includes data of only one physical page, said apparatus further comprising means for selecting operation in one of the first and second modes.

4. An apparatus according to claim 3, wherein said selecting means selects operation in one of the first and second modes in response to information indicating a faculty of the receiver.

5. An image communication system for communicating an image block having a predetermined information amount in an error retransmission mode, said system comprising:

means in a receiver for transmitting to a transmitter a signal representing an amount of image signal data receivable at one time;

means in said transmitter for transmitting an image information unit which includes multiple page image information, without a procedure signal being transmitted between pages, and at least one image block, said unit being of a size equal to the receivable data amount; and means in said transmitter for transmitting a signal representing a punctuation of the image information unit.

6. An image communication system according to claim 5 further comprising:

means in said receiver for transmitting, at one time, a page number, a block number and a frame number of a received error frame together with the data amount receivable at one time, when the error frame is included in the received image signal after the reception of the signal representing the punctuation of the transmission of the image signal; and means in said transmitter for sequentially transmitting the page, block and frame numbers transmitted by said receiver and then transmitting a next multiple page image signal of the amount receivable transmitted by said receiver.

7. A data communication method for transmitting a data block having a predetermined data amount from a transmitter to a receiver by an error retransmission mode and for the receiver requesting, to the transmitter, retransmission of the data block when an error is included in the data block as received by the receiver, said method comprising the steps of, at the transmitter:

storing data corresponding to a plurality of physical pages;

forming the stored data into a sequence of at least one data block, each data block containing at most a predetermined amount of data and each data block in sequence being formed from as many pages of the stored data as possible while not exceeding the predetermined amount; and transmitting the at least one data block block by block.

8. A method according to claim 7, wherein the stored data is image data.

9. A method according to claim 7, wherein the error retransmission mode is an error correction mode based on an ITU-T recommendation.

10. A data communication method for transmitting a data block having a predetermined data amount from a transmitter to a receiver by an error retransmission mode and for the receiver requesting to the transmitter, retransmission of the data block when an error is included in the data block as received by the receiver, said method comprising the steps of, at the transmitter:

storing data corresponding to a plurality of physical pages;

forming a data block including the stored data corresponding to a plural number of the plurality of physical pages; and transmitting the data block, wherein the transmitter is operative in either a first mode, wherein a data block to be transmitted includes data corresponding to a plural number of physical pages, or a second mode, wherein a data block to be transmitted includes data of only one physical page, said method further comprising the step of selecting operation in one of the first and second modes.

11. A method according to claim 10, wherein said selecting step includes selecting operation in one of the first and second modes in response to information indicating a faculty of the receiver.

12. A data communication apparatus for transmitting a data block having a predetermined data amount to a receiver by an error retransmission mode and which enables requesting, by the receiver to said apparatus, retransmission of the data block when an error is included in the data block as received by the receiver, said apparatus comprising:

means for storing data corresponding to a, plurality of physical pages;

means for forming the stored data into a sequence of at least one data block, each data block containing at most a predetermined amount of data and each data block in sequence being formed from as many pages of the stored data as possible while not exceeding the predetermined amount; and means for transmitting the at least one data block block by block.

13. An apparatus according to claim 12, wherein the stored data is image data.

14. An apparatus according to claim 12, wherein the error retransmission mode is an error correction mode based on an ITU-T recommendation.

15. An image communication method used in an error retransmission mode comprising the steps of:

informing, by a receiver to a transmitter, an amount of data receivable at one time;

transmitting, by the transmitter, data in the amount receivable at one time;

informing, by the receiver to the transmitter, a new amount of data receivable for a next transmission and an error frame received in a previous transmission; and transmitting by the transmitter, at one time, the error frame followed by next data in the new designated data amount, wherein the data transmitted any one time includes multiple page data without a procedure signal being transmitted between pages.

* * * * *

UNITED STATES PATENT AND TRADEMARK OFFICE
CERTIFICATE OF CORRECTION

PATENT NO. : 5,949,552

DATED : September 7, 1999

INVENTOR(S) : TAKEHIRO YOSHIDA

It is certified that error appears in the above-identified patent and that said Letters Patent is hereby corrected as shown below:

COLUMN 1

Line 39, "page" should read --pages--.

COLUMN 2

Line 14, "invention," should read --invention--.

COLUMN 3

Line 12, "Q-PSK." should read --Q·PSK.--.
    Line 27, "line b." should read --line 28b.--.

COLUMN 6

Line 22, "requires" should read --required--.
    Line 25, "second" should read --seconds--.

COLUMN 7

Line 60, "block block" should read --block, block--.

UNITED STATES PATENT AND TRADEMARK OFFICE
CERTIFICATE OF CORRECTION

PATENT NO. : 5,949,552

DATED : September 7, 1999

INVENTOR(S) : TAKEHIRO YOSHIDA

It is certified that error appears in the above-identified patent and that said Letters Patent is hereby corrected as shown below:

COLUMN 8

Line 33, "a," should read --a--.
    Line 41, "block block" should read --block, block--.

Signed and Sealed this

Eleventh Day of April, 2000

Attest:

Attesting Officer

Q. TODD DICKINSON

Director of Patents and Trademarks